UNITED STATES PATENT OFFICE.

CARLETON ELLIS, OF MONTCLAIR, NEW JERSEY, ASSIGNOR TO COPPER OIL PRODUCTS COMPANY, A CORPORATION OF NEW YORK.

WOOD-PRESERVING COMPOSITION.

991,434. Specification of Letters Patent. Patented May 2, 1911.

No Drawing. Application filed September 21, 1910. Serial No. 582,989.

*To all whom it may concern:*

Be it known that I, CARLETON ELLIS, a citizen of the United States, and resident of Montclair, in the county of Essex and State of New Jersey, have invented certain new and useful Improvements in Wood-Preserving Composition, of which the following is a specification.

This invention relates to a composition for preserving wood and particularly relates to a composition containing certain metallo-organic compounds having antiseptical and fungicidal properties, all as hereinafter described and claimed.

The present invention has for its object the production of a composition for preserving wood that will have powerful bacterial antiseptic and fungicidal properties, which will water-proof the wood satisfactorily and which may be made from ordinary petroleum or asphaltum oils such as are easily and cheaply obtained in this country.

The composition involves the use of a preservative element such as a copper compound soluble in oil, or other metallo-organic compound having a high degree of solubility in oil, and possessing powerful preserving properties. Among the other metals suitable for this application are zinc, mercury and arsenic.

In United States Patent No. 871,392 I have described a composition which involves the use of carbolate of copper. I also mentioned in the specification of said patent the use of resinate of copper. In asphaltic oils, which are the ones best adapted for this use, I have found the bodies referred to in the above-mentioned patent are either insufficiently soluble, or are not sufficiently permanent to give satisfactory results under severe service conditions.

The present invention in particular concerns the use of metallo-organic compounds which are readily soluble in the cheap and easily obtained asphaltum or petroleum oils and which remain permanently dissolved therein and in condition to be permanently effective as preservative material. The compounds which I have found especially useful for such purposes are the copper bodies formed by uniting a copper base with certain of the rubber resins, and in particular with the liquid rubber resin known as guayule resin. The latter contains resin acids which combine readily with copper oxid, hydrate or carbonate, to form what may be termed a copper guayulate. This reaction is greatly facilitated by the presence of oleic acid and in practice I make a double combination of the guayule resin and oleic acid thus forming a sort of double copper oleate and guayulate. This double compound may be readily made by heating five parts of copper carbonate with ten parts of guayule resin and five parts of oleic acid. The latter may be the commercial form known as "red oil" which is obtained by the autoclave saponification of oils. Inasmuch as the stearate and palmitate of copper are not especially desirable for this purpose, the stearic and palmitic acids contained in red oil may be removed by pressing, thereby securing the red oil or oleic acid in a fairly pure condition. The copper carbonate is heated with these oils and oily resins to a temperature of about 160° C. The copper slowly combines with the evolution of gas and the material foams a good deal during the period of gas evolution so that a capacious kettle should be used in this operation. When the evolution of gas has ceased the copper will be found largely in combination with the guayule resin and red oil in a condition which permits of its solution in ordinary asphaltum oil merely by warming until in complete solution. With the resinate or carbolate of copper it is possible to get into solution only a minute amount of copper under such conditions, while in the present invention it is possible to introduce several per cent. of copper without danger of precipitation of the copper compound on standing. This is an important consideration when wood is exposed to severe service conditions, as the decay of cellulose under these circumstances is very rapid, unless a substantial proportion of copper is present.

The copper compound made as above, or in any suitable manner, may be incorporated with the petroleum or asphaltum oil in a proportion to afford, say two or three per cent. or more of the copper body. This composition may then be used for impregnation of wood of every description, such as ties, piling, posts, mine timbers and the like. It has the additional advantage over creosote in that by the use of a heavy oil, such as asphaltic oil, the composition may be heated in the iron heating tanks to a high temperature without danger of corrosion of the iron and without fear of explosion or danger of inflammation. Hence wear and tear on the apparatus used for heating is minimized and fire risks are largely eliminated.

Another composition which may be made in a similar manner is as follows: Five parts of copper hydrate and four parts of oxid of mercury are combined with ten parts of guayule resin and fifteen parts of red oil. This mixture is reduced with 800 parts of heavy asphaltic oil.

By asphaltic oil, as used herein, I refer to those oils of asphaltic nature or origin, such as the malthas or mineral tars and the residue obtained through distillation of crude petroleum oils containing asphaltic bodies.

The formulas herein given are illustrative and it will be evident that the proportions may be varied to secure special preservation particularly adapted for certain applications, and I do not wish to restrict myself, under the present invention, to the proportions hereinbefore set forth.

What I claim is:—

1. A wood preserving composition, comprising copper guayulate and oleate in solution in heavy asphaltic oil.

2. A wood preserving composition, comprising copper guayulate and copper oleate in solution in a mineral oil.

3. A wood preserving composition, comprising the copper compound of a rubber resin dissolved in an asphaltic oil.

4. A wood preserving composition, comprising a metallo-organic compound including a rubber resin and a heavy mineral oil, said metallo-organic compound being in solution in said oil.

Signed at Montclair in the county of Essex and State of New Jersey this 12th day of September A. D. 1910.

CARLETON ELLIS.

Witnesses:
NATHANIEL L. FOSTER,
BIRDELLA M. ELLIS.